US007778622B2

(12) United States Patent
Su

(10) Patent No.: US 7,778,622 B2

(45) Date of Patent: Aug. 17, 2010

(54) POSITIONING AND RECORDING INFORMATION SYSTEM FOR RESCUE AT SEA IMPLEMENTED WITH A MULTI-HOPPING TECHNIQUE AND WITHOUT USING GPS

(76) Inventor: Hsin-Chi Su, 12F, No. 167, Fu Hsin N. Road, Taipei (TW)

( * ) Notice: Subject to any disclaimer, the term of this patent is extended or adjusted under 35 U.S.C. 154(b) by 579 days.

(21) Appl. No.: 11/562,534

(22) Filed: Nov. 22, 2006

(65) Prior Publication Data

US 2008/0117082 A1 May 22, 2008

(51) Int. Cl.
*H04B 1/16* (2006.01)

(52) U.S. Cl. ...................... 455/338; 455/11.1; 455/445; 455/41.2

(58) Field of Classification Search .................. 455/338
See application file for complete search history.

(56) References Cited

U.S. PATENT DOCUMENTS 6,222,484 B1 * 4/2001 Seiple et al. ........... 342/357.09
6,421,608 B1 * 7/2002 Motoyama et al. .......... 701/213
6,778,809 B2 * 8/2004 Morimoto .................. 455/11.1
2005/0099974 A1 * 5/2005 Kats et al. .................... 370/328
2007/0187409 A1 * 8/2007 Wilford et al. ........... 220/367.1
2007/0286152 A1 * 12/2007 Prakash et al. .............. 370/349

* cited by examiner

*Primary Examiner*—Duc Nguyen
*Assistant Examiner*—Ajibola Akinyemi
(74) *Attorney, Agent, or Firm*—Rabin & Berdo, P.C.

(57) ABSTRACT

A positioning and recording information system for rescue at sea implemented with a multi-hopping technique. At least two stations transmit navigation information to one another in the form of data packets. The data packets are received and temporarily stored in the stations. The steps of transmitting, receiving and storing are repeated to form a network topology that records a track of a station mounted on a ship. When the ship meets with misfortune at sea, the latest data packet transmitted by the ship provides a position near the location of the ship accident. Consequently, the rescue can be started immediately, and efficiency of a rescue operation is improved when compared to traditional ways of estimating a ship's position.

19 Claims, 5 Drawing Sheets

POSITIONING AND RECORDING INFORMATION SYSTEM FOR RESCUE AT SEA IMPLEMENTED WITH A MULTI-HOPPING TECHNIQUE AND WITHOUT USING GPS

FIELD OF THE INVENTION

The present invention relates to a positioning and recording information system for rescue at sea, and more particularly to a positioning and recording information system for rescue at sea implemented with a multi-hopping technique.

BACKGROUND OF THE INVENTION

About 70% of the surface of the earth is water that is predominantly oceans. Accordingly, no matter how human culture and technology develop, mankind is extremely dependent on the ocean. Many governments' current ocean policies emphasize issues of ocean traffic safety, rescue at sea, fishery resources management and so on.

A ship's log traditionally provides a full nautical record of a ship's voyage including location and speed of the ship, observations from the ship and events occurring on the ship. However, most ship's logs are not useful immediately in effecting a rescue when a ship accident occurs because the ships' logs are aboard ship rather than in the hands of the rescuers.

At present, three systems are used for rescue on the ocean and include the Global Maritime Distress and Safety System, the Ship Security Alert System and the Automatic Identification System (AIS). When a ship meets with misfortune, the three systems send out emergency distress signals through the Global Positioning System (GPS), and the rescue is executed in the area where the emergency distress signals are transmitted.

Because the GPS is extremely expensive to use to report a ship's position, most ship companies cannot afford to transmit signals frequently via GPS. The late known position at the receiving end is not the same as the position of the ship at the time of an accident, so there are often great mistakes in rescue on the ocean, such as delayed rescue, incorrect rescue areas, etc. Research related to AIS by Lloyd's Register indicates that AIS often has insufficient messages about the destination, speed, direction and so on of a specific ship at a specific time to adequate determine the ship's position. Insufficient messages are often the key factors leading to inefficient rescues on the sea.

U.S. Pat. No. 6,778,809 B2 published on Aug. 17, 2004 titled "Mobile Network for Remote Service Areas Using Mobile Stations" disclosed a system and method for transmitting and receiving data in a mobile communication network. The system includes one or more mobile stations for transmitting data in a mobile digital network. The mobile stations are configured to act as buffer/repeaters by storing and forwarding data signals until they are received by a specific destination station. A relay means is utilized in the system to form the mobile network. However, the distance from one station to an adjacent station in an international shipping route is usually too far for the ships to effectively communicate. The relay means has the following problems 1. The data origin is too far away from the destination resulting in an excessive hop count, and the communication efficiency decreases when the relay count increases.
2. All the stations in the shipping route are not connected to other ships all the time so communication is often intermittent.

Based on the foregoing problems, once the data signals received from a ship meeting with misfortune are not sufficient to identify a ship's accident position. Finding a way to obtain a correct position for a ship's accident is urgent required to affect timely rescues.

SUMMARY OF THE INVENTION

The problems set forth above may at least in part be solved by a system that is capable of utilizing a multi-hopping technique to provide sufficient messages about shipwrecks for positioning and rescue at sea.

A positioning and recording information system for rescue at sea is implemented with multi-hopping techniques and is characterized that at least two stations are utilized for transmitting, receiving and storing information through digital communication and Internet access for mobile vessels. The information about each station is processed into data packets to be position data. The data packets are temporarily stored in temporary repositories of the stations. The system comprises at least one fixed station representing a destination station and multiple mobile stations. The fixed station comprises hopping software and a communication device and processes received data packets into applicable information for positioning. The mobile stations comprise hopping software and communication devices and transmit and store the data packets in a signal-transmitted area. A first mobile station transmits data packets to second and third mobile stations using the hopping software and stores the data packets. After the data packets are received and stored in the second and third mobile stations through the communication devices, both stations transmit feedback data packets to the first mobile station by the hopping software and store feedback data packets. In addition, the second mobile station transmits a data packet to the third mobile station by the hopping software and stores the data packet. After the data packet is received through the communication device and stored in the third mobile station, the third mobile station transmits a feedback data packet to the second mobile station by the hopping software and stores the feedback data packet. Eventually, the data packets are received and stored in the destination station.

Every station has an identification code that is an Internet Protocol address. The fixed station could be at a port or mounted on a buoy. The mobile station could be mounted on a ship. The stations transmit data packets to one another to form a network. After being transmitted among several mobile stations, the data packets are received and stored in the destination station that processes the data packets into applicable information. The data packets include information such as station identification codes, the time when the data packets were transmitted and received, the position of a mobile station where the data packets were transmitted and received, etc. The position is shown using longitude and latitude. Digital communication could be affected using the IEEE 802.11 standard, radio transmission, infrared transmission or Worldwide Interoperability for Microwave Access. When processing the data packets, the data packets are temporarily stored in the temporary repositories of the stations, and the temporary repository could be a disk or a network disk. The data packets are composed of multiple bits and could be binary, octal or the hexadecimal. When the mobile stations are on ships, the data packets further comprise navigation information such as course, speed, serial number of the current waypoint, the distance from the waypoint, the estimated time of arrival at the next waypoint, the distance off the route, etc.

The system transmits data packets using a multi-hopping technique that is based on the IEEE 802.11 standard instead of the Global Positioning System. Without the huge expense of using the Global Positioning System, ship companies are able to afford to transmit and update signals frequently. The system improves the communication efficiency of the network implemented with the multi-hopping technique. Therefore, whenever and wherever a ship accident occurs, the information needed for the rescue is identified by the latest data packet that is transmitted and received. The identified location is closer to the disaster position so rescue can be affected more efficiently.

BRIEF DESCRIPTION OF THE DRAWINGS

Advantages and features of this invention in the following detailed description will become more apparent when taken in conjunction with the following drawings.

DESCRIPTION OF THE PREFERRED EMBODIMENT

Figure 1:
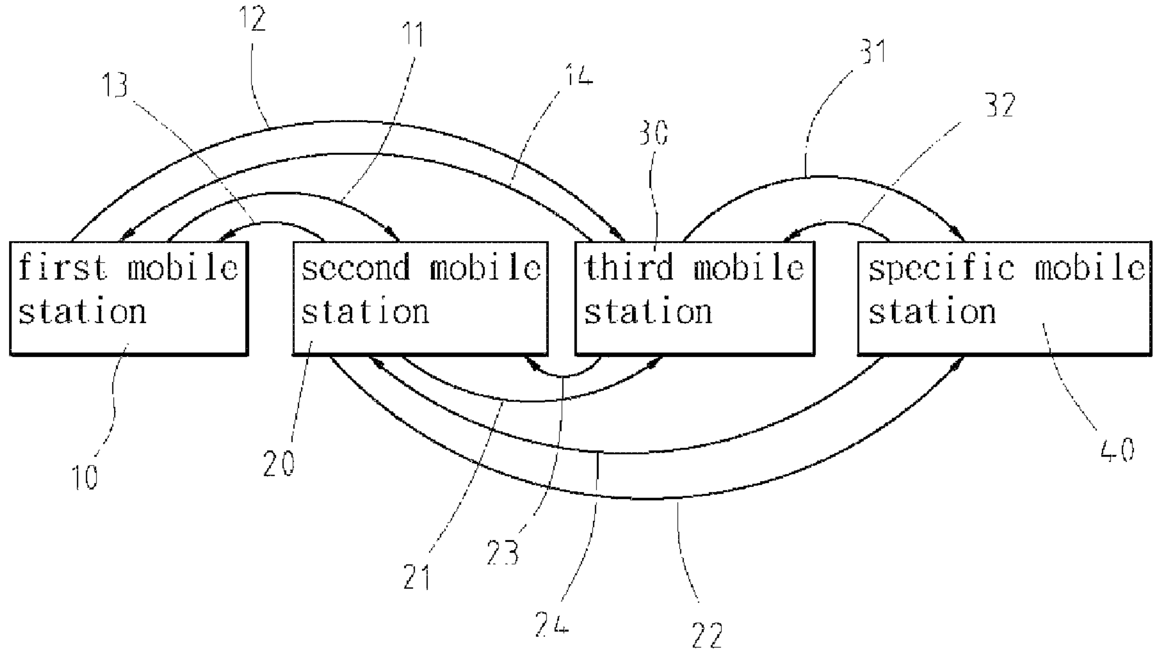
FIG. 1 is a diagram of multiple ships transmitting and recording positioning information with a first embodiment of a system for rescue at sea with multi-hopping technique in accordance with the present invention.
Figure 3:
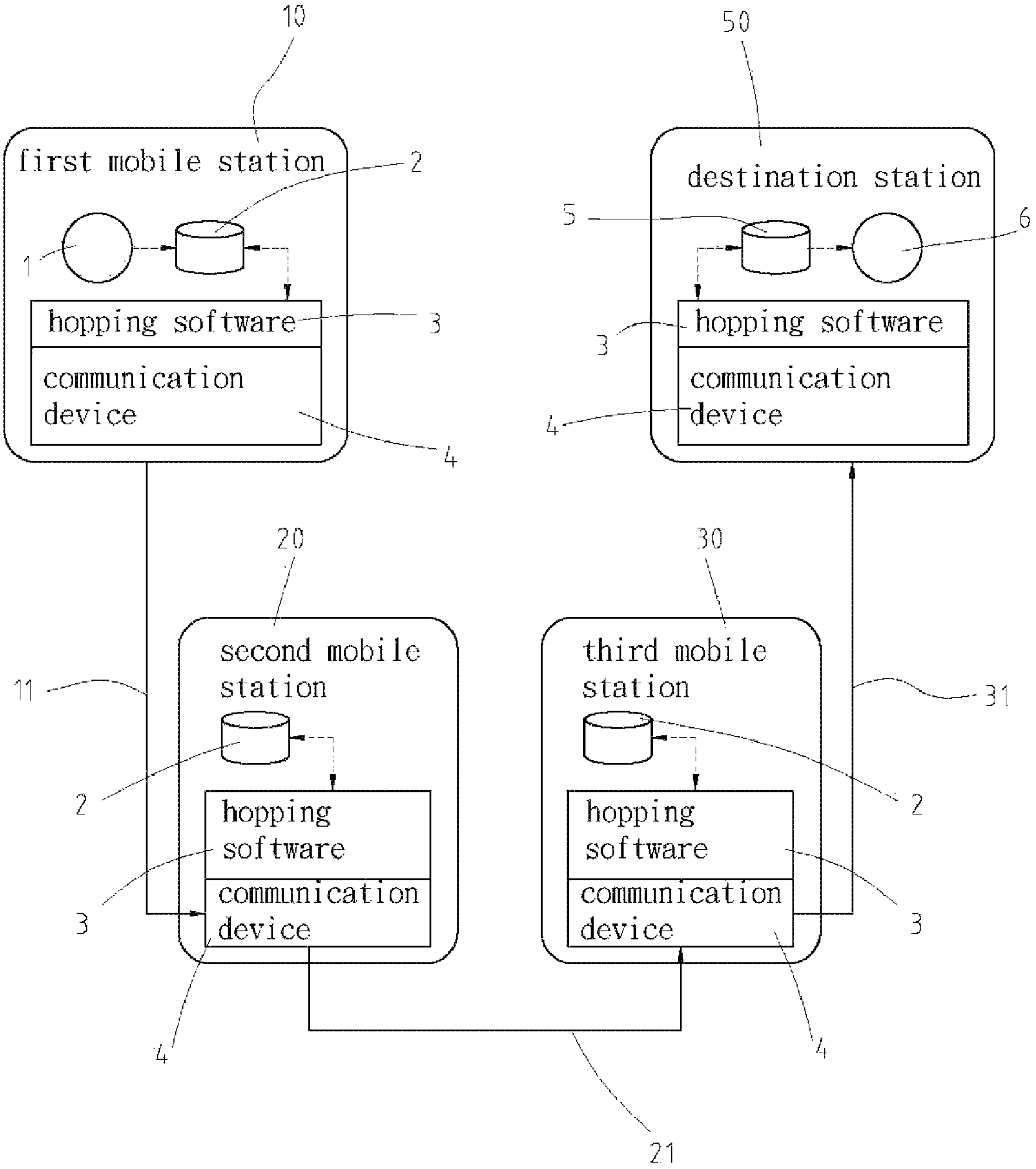
FIG. 3 is a functional block diagram of the positioning and recording information system in FIG. 1 in a connected network.
Figure 4:
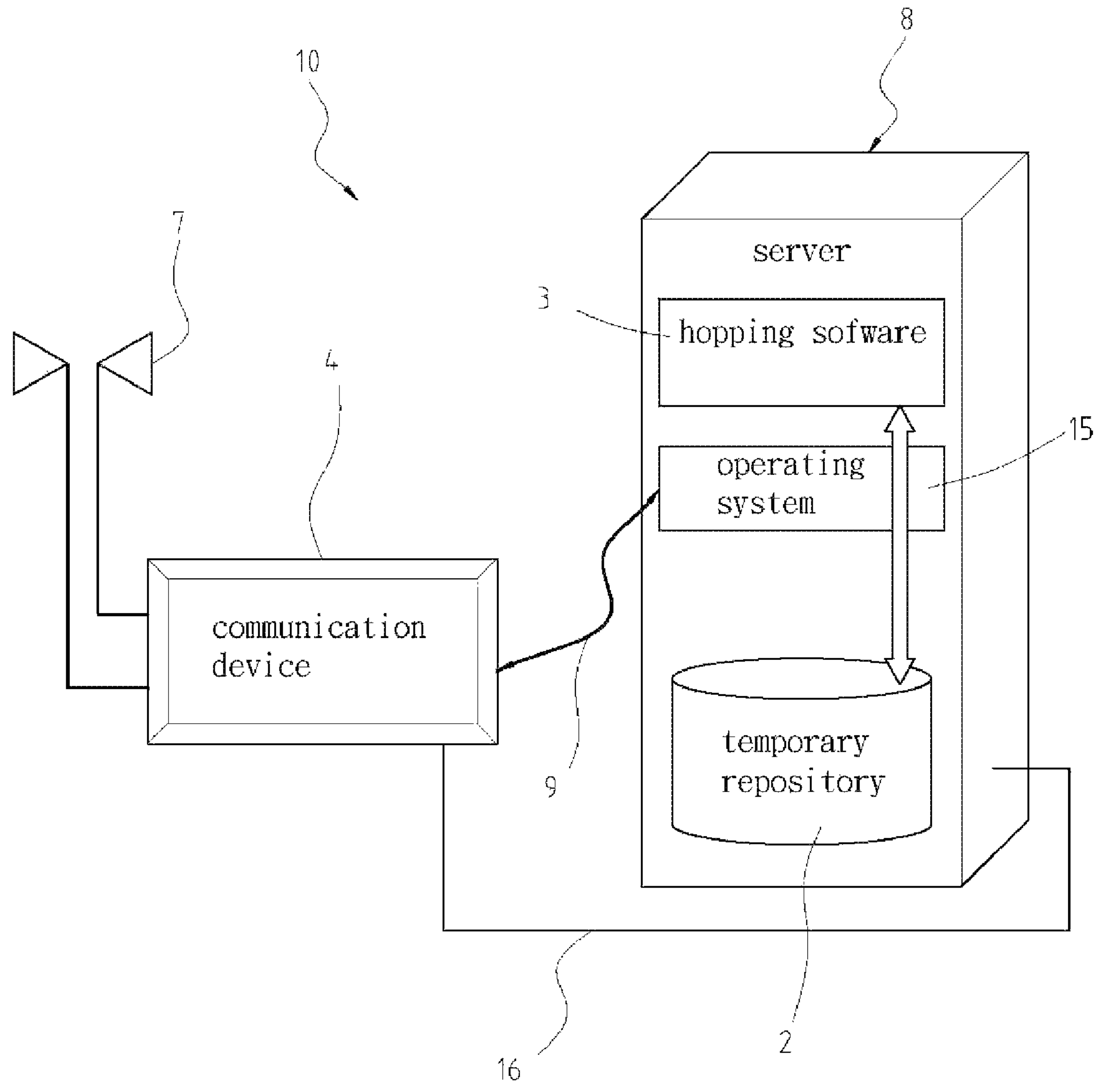
FIG. 4 is a functional block diagram of one station in the positioning and recording information system FIG. 1.

With reference to FIGS. 1, 3 and 4, a positioning and recording information system for rescue at sea implemented with a multi-hopping technique in accordance with the present invention requires at least two stations. Each station transmits, receives and stores information using digital communications and Internet access for mobile vessels. Information pertaining to each station 10, 20, 30, 40 is processed into data packets 11, 12, 13, 14, 21, 22, 23, 24, 31, 32 containing position data. Information about a first mobile station 10 is processed into a data packet 11. The data packet 11 is transmitted from the first mobile station 10 to a second mobile station 20 in a signal-reception area of the first mobile station 10 by communication devices 4 controlled by hopping software 3 in both stations 10, 20 and is stored in temporary repositories 2 in of both stations 10, 20. If a third mobile station 30 is also in the signal-reception area of the first mobile station 10, the information about the first mobile station 10 is also processed into another data packet 12. The data packet 12 is transmitted from the first mobile station 10 to the third mobile station 30 by the hopping software and is stored in the temporary repositories 2 of both stations. After the second mobile station 20 and third mobile station 30 receive the data packets 11 and 12, feedback data packets 13 and 14 are transmitted respectively from the second mobile station 20 and third mobile station 30 to the first mobile station 10 by the hopping software and are stored in the temporary repositories 2 of the stations 10, 20, 30.

Information about the second station 20 and the data packet 11 received by the second station 20 from the first station 10 are both processed into a data packet 21. The data packet 21 is transmitted from the second mobile station 20 in a signal-reception area of the second station 20 to the third mobile station 30 by the hopping software and is stored in the temporary repositories 2 of both stations 20, 30. A data packet 22 is also transmitted from the second mobile station 20 to a specific mobile station 40 and is stored in the temporary repositories 2 of both stations 20, 40. After the third mobile station 30 and specific mobile station 40 receive the data packets 21 and 22 through the communication devices, feedback data packets 23 and 24 are transmitted respectively from the third mobile station 30 and specific mobile station 40 to the second mobile station 20 by the hopping software and are stored in the temporary repositories 2 of the stations 20, 30, 40.

Information about the third mobile station 30 and the data packet 21 received by the third mobile station 30 are both processed into a data packet 31. The data packet 31 is transmitted from the third mobile station 30 in the signal-reception area of the third mobile station 30 to the specific mobile station 40 by the hopping software and is stored in the temporary repositories 2 of both stations 30, 40. After the specific mobile station 40 receives the data packet 31, a feedback data packet 32 is transmitted from the specific mobile station 40 to the third mobile station 30 by the hopping software and is stored in the temporary repositories 2 of the stations 30, 40.

Figure 5:
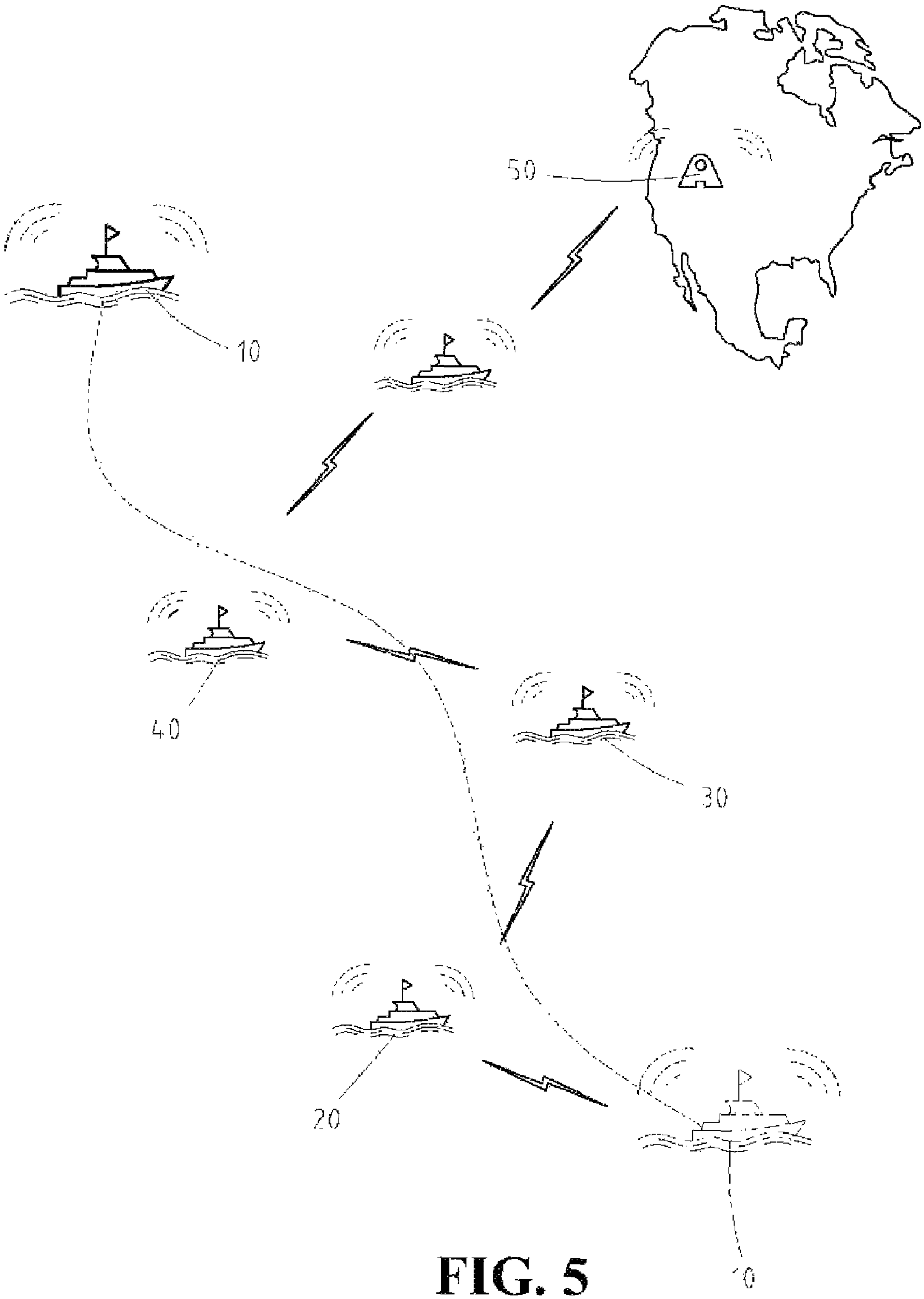
FIG. 5 is an operational diagram of a mobile station moving and transmitting to form a moving track for positioning.

With further reference to FIG. 5, the data packets 11, 12, 13, 14, 21, 22, 23, 24, 31, 32 are transmitted between multiple stations 10, 20, 30, 40, 50 to form a network topology and are stored in the temporary repositories 2, 5. If one of the stations 10, 20, 30, 40 meets with misfortune, the location where the accident occurred is identified in the network topology by the latest data packet 11, 12, 13, 14, 21, 22, 23, 24, 31, 32 received by any of the other stations 10, 20, 30, 40, 50.

Figure 2:
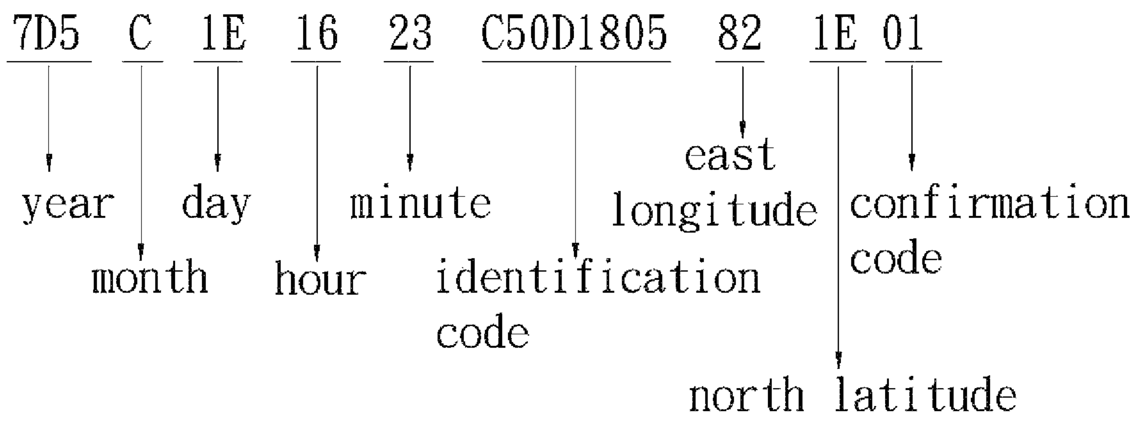
FIG. 2 is a diagram of a first embodiment of a data packet used in the positioning and recording information system in FIG. 1.

With further reference to FIG. 2, the data packets 11, 12, 13, 14, 21, 22, 23; 24, 31, 32 are composed of multiple bits and could be binary, octal or hexadecimal systems. A data packet could be a 24-bits code if it includes an identification code of a station 10 sending the original position, time when the data packet 11, 12, 13, 14, 21, 22, 23, 24, 31, 32 is transmitted and received and the position where the data packet 11, 12, 13, 14, 21, 22, 23, 24, 31, 32 is transmitted and received. The position is shown as longitude and latitude. For example, a data packet 11 transmitted at 10:35 PM on Dec. 30, 2005 at E130°, N30°, from a mobile station 10 coded as 197.13.24.05 using a hexadecimal system would be 7D5C1E1623C50D1805821E01. The first three bits represent the year. The fourth bit represents the month. The fifth and sixth bits represent the day of the month. The seventh and eighth bits represent the hour on a 24 hour clock. The ninth and tenth bits represent the minute. The eleventh to eighteenth bits represent the identification code that is the Internet Protocol address, in this case 197.13.24.05. The nineteenth to twenty-second bits represent the east longitude and north latitude. The last two bits are a confirmation code for the data packet 11, 12, 13, 14, 21, 22, 23, 24, 31, 32. The confirmation code reflects the transmission state of the data packet 11, 12, 13, 14, 21, 22, 23, 24, 31, 32. “00” indicates unsuccessful transmission, “01” indicates successful transmission, and “02” indicates a retransmission is being performed. Furthermore, each digit of the data packet 11, 12, 13, 14, 21, 22, 23, 24, 31, 32 may be encoded with encoding techniques such as error detection and correction codes. The encoding techniques are not restricted to the format and content of the bits and information mentioned above.

The data packets 11, 12, 13, 14, 21, 22, 23, 24, 31, 32 transmitted by the stations 10, 20, 30, 40 are temporarily stored in the temporary repositories 2 that could be a disk and a network disk. The information about the first mobile station 10 is translated into a transmittable data packet 11 by an application program 1 in the first mobile station 10. The data packet 11 is stored in the temporary repository 2, and the data packet 11 is transmitted from the first mobile station 10 to the second mobile station 20 by the hopping software 3 and the communication device 4 through an antenna 7. After the data packet 11 is received by the communication device 4 of the second station 20, it is stored in the temporary repository 2. Simultaneously, the received information and the information about the second station 20 are transmitted in the form of a data packet 21 through the hopping software 3 and the communication device 4 of the mobile station 20 to the third mobile station 30. After the data packet 21 is received by the communication device 4 of the third mobile station 30, it is stored in the temporary repository 2. Simultaneously, the information received by the third mobile station 30 and the information about the third mobile station 30 are transmitted in the form of a data packet 31 through the hopping software 3 and the communication device 4 to the destination station 50. The data packet 31 from the third mobile station includes information about the first mobile station 10, the second mobile station 20 and the third mobile station 30. The data packet 31 is received at the destination station 50, stored in the repository 5 and translated into applicable information by an application program 6 at the destination station 50.

The fixed station of the present invention could be mounted on a buoy or at a port. The mobile station of the present invention could be mounted on a ship. If the mobile station is mounted on a ship, the data packets further comprises navigation information such as the course, the speed, the serial number of current waypoint, the distance from the waypoint, the estimated time of arrival at the next waypoint, the distance off the route, etc.

The first mobile station 10 comprises a server 8, a communication device 4, an antenna 7 and a power supply 16. The server 8 comprises an operating system 15, hopping software 3 and a temporary repository 2. The operating system 15 of the server 8 transmits the information about the station 10 to the hopping software 3 to form a data packet 11. The data packet 11 is stored in the temporary repository 2. Simultaneously, the operating system 15 transmits the data packet 11 to the communication device 4 and antenna 7 through a transmission medium 9, and further forwarding the data packet 11 to other stations by the communication device 4 and the antenna 7. Besides, the communication device 4 and antenna 7 of the first mobile station 10 receive data packets from other stations. The received data packets are transmitted through the transmission medium 9 to the operating system 15, are stored in the temporary repository 2 and are transmitted to other stations.

The digital communication could be the IEEE 802.11 standard, radio transmission, infrared transmission or Worldwide Interoperability for Microwave Access. In this embodiment, the stations communicate on the basis of the IEEE 802.11 standard. With reference to FIG. 5, the data packet from the first mobile station 10 is transmitted to other stations by the multi-hopping means in the signal-receprion area. Since the first mobile station 10 keeps moving and transmitting the data packets, the position of the first mobile station 10 and its track can be identified by the destination station 50. The destination station 50 processes the received data packets into applicable information for positioning. Therefore, when a ship accident occurs, the position where the ship signal disappears can be identified so a rescue can be started without delay.

The present invention utilizes the multi-hopping means instead of the Global Positioning System to transmit data packets. Accordingly, ship companies can afford to transmit signals frequently. The present invention also improves the communication efficiency of the network. When a ship accident occurs, the latest information received in the destination station is closer to the real situation compared to that of the prior art, and the rescue can be started without delay.

While the present invention has been described in connection with a preferred embodiment thereof, changes and modifications may be made without departing from the true spirit and scope of the present invention. Accordingly, the appended claims intend to cover all such changes and modifications as come within the spirit and scope of the invention.

What is claimed is:

1. A positioning and recording information system for rescue at sea, wherein:

the positioning and recording information system is implemented with a multi-hopping technique; and at least two stations are utilized, and each said station transmits, receives and stores information using digital communication and Internet access for mobile vessels, the information about each station being processed into data packets being position data, the data packets temporarily being stored in temporary repositories of the stations, the system comprising:

at least one fixed station of the stations, representing a destination station, comprising hopping software and a communication device and processing received data packets into applicable information for positioning;

a plurality of mobile stations of the stations, comprising hopping software and communication devices, and configured to transmit and store the data packets in a signal-reception area;

the system comprising means for:

transmitting and storing data packets from a first mobile station to second and third mobile stations by using the hopping software;

receiving and storing the data packets in the second and third mobile stations through the communication devices;

after receiving and storing in the second mobile station the data packets transmitted from the first mobile station, transmitting first feedback data packets from the second mobile station to the first mobile station by using the hopping software, and storing the first feedback data packets in the second mobile station and the first mobile station;

after receiving and storing in the third mobile station the data packets transmitted from the first mobile station, transmitting second feedback data packets from the third mobile station to the first mobile station by using the hopping software, and storing the second feedback data packets in the third mobile station and the first mobile station;

transmitting and storing a data packet from the second mobile station to the third mobile station by using the hopping software;

receiving and storing the data packet in the third mobile station through the communication devices;

after receiving and storing in the third mobile station the data packets transmitted from the second mobile station, transmitting third feedback data packets from the third mobile station to the second mobile station by using the hopping software, and storing the third feedback data packets in the third mobile station and the second mobile station; and eventually receiving and storing the data packets in the destination station.

2. The system of claim 1, wherein the station comprises an identification code.

3. The system of claim 2, wherein the identification code is the Internet Protocol address.

4. The system of claim 1, wherein the fixed station is set at a port.

5. The system of claim 1, wherein the fixed station is set on a buoy.

6. The system of claim 1, wherein the mobile station is set on a ship.

7. The system of claim 1, wherein the destination station processes the received data packets.

8. The system of claim 1, wherein the data packets include the information such as the identification codes of stations, the time when the data packets transmitted and received, and the position where the data packets transmitted and received.

9. The system of claim 8, wherein the position is showed by the longitude and latitude.

10. The system of claim 8, wherein the data packets are composed of a plurality of bits.

11. The system of claim 8, wherein the data packets are composed of the binary, octonary and hexadecimal systems.

12. The system of claim 8, the data packets further include navigation information when the mobile station is set on a ship.

13. The system of claim 12, wherein the navigation information include the navigation direction, the navigation speed, the serial number of current route plan point, the distance from the route plan point, the estimated time of arrival and the distance diverging from the route.

14. The system of claim 1, wherein the stations transmit data packets on the basis of the IEEE 802.11 standard.

15. The system of claim 1, wherein the stations transmit data packets on the basis of the radio.

16. The system of claim 1, wherein the stations transmit data packets on the basis of the infrared ray.

17. The system of claim 1, wherein the stations transmit data packets on the basis of the Worldwide Interoperability for Microwave Access.

18. The system of claim 1, wherein the temporary repository is a disc.

19. The system of claim 1, wherein the temporary repository is a network disc.

* * * * *